Aug. 20, 1957  L. T. WHITEHEAD  2,803,429
CONSTRUCTION OF GAS TURBINE PLANT
Filed March 19, 1951  2 Sheets-Sheet 1

Inventor
Leslie Thomas Whitehead
By
Stevens, Davis, Miller and Mosher
His Attorneys

United States Patent Office 2,803,429
Patented Aug. 20, 1957

2,803,429

CONSTRUCTION OF GAS TURBINE PLANT

Leslie Thomas Whitehead, Farnborough, England, assignor to Power Jets (Research and Development) Limited, London, England, a British company Application March 19, 1951, Serial No. 216,289

Claims priority, application Great Britain March 27, 1950

8 Claims. (Cl. 253—39)

This invention relates to the construction of elastic-fluid turbine plant and is concerned with the provision of a construction allowing for thermal expansion and furthermore affording easy access to the bearings and the turbine interior for inspection.

According to the invention the stator casing is mounted at each end on the rotor bearing units; furthermore the mounting means permit free thermal expansion of the stator in diameter and also in length. The mounting means may conveniently consist of radially relatively slidable elements, such as pegs slidable in guides, disposed around the turbine axis on the bearing unit at one end of the rotor and relatively axially slidable elements, such as keys slidable in keyways, disposed around the turbine axis on the bearing unit at the other end.

According to further features of the invention the stator casing is split lengthwise into sections separable sideways; also if the inlet and outlet ducts envelop the bearings, these ducts are axially separable from the other parts of the stator and the bearings are movably mounted on some part of the bearing units—e. g. they are withdrawable from bearing housings so that they can be withdrawn from the ducts for inspection.

Figure 2:
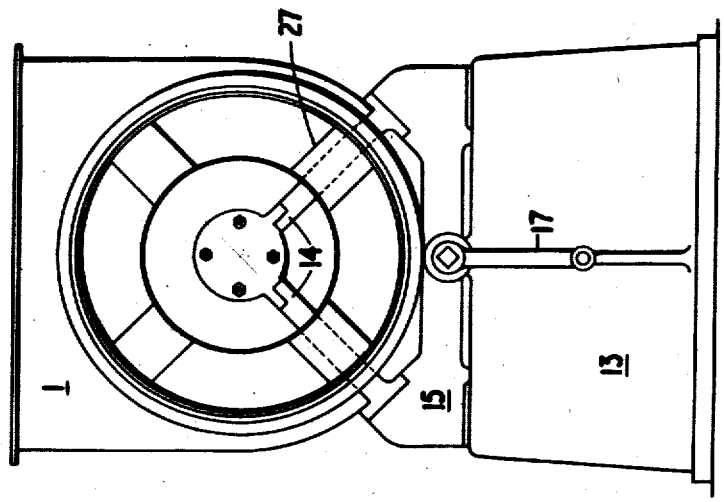
Figure 1:
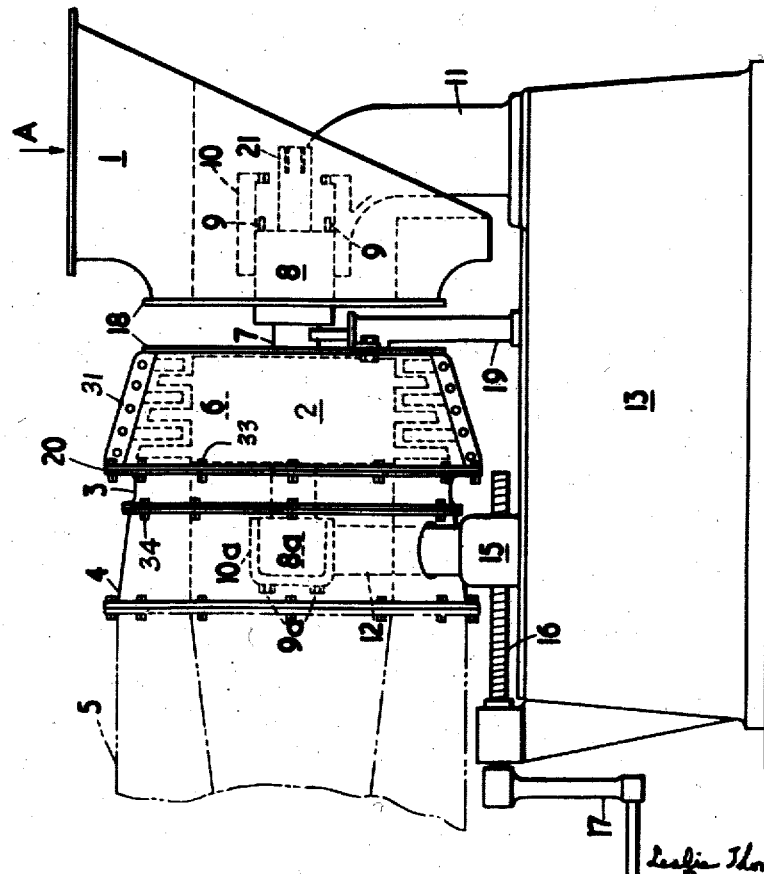

Of the accompanying drawings, Figure 1 represents diagrammatically the side elevation of a gas turbine plant, showing one bearing partially withdrawn from its housing. Figure 2 is an end view of the plant from the exit duct end and Figure 3 is an axial section of the upper half of the plant showing diagrammatically its internal construction.

Referring to Figs. 1 and 2, the stationary structure of the plant comprises an inlet volute duct 1, a stator 2 enclosing the rotor, annular sections 3 and 4, forming an outlet duct, and the exhaust duct extension 5, these sections being formed with axially abutting circumferential flanges detachably connected coaxially in end to end relationship by means of rows of nuts and bolts 32, 33, 34. The working fluid enters the volute casing as indicated by the arrow A, passes through the inlet duct and enters and drives the turbine rotor 6 which drives the output shaft 21. The rotor is carried on shaft 7 which is mounted in cartridge type bearing units 8 and 8a. As will be seen from Figure 3, the bearing unit 8 consists of a shell 29 carrying internally the outer race of a ball bearing 30, the inner race of which is carried on the shaft 7. Similarly the bearing unit 8a consists of a shell 29a and ball bearing 30a. The bearing shells 29, 29a are withdrawably mounted in and secured by studs and nuts 9, 9a in bearing housings 10 and 10a, which are supported by pedestals 11 and 12 respectively. The pedestal 11 consists of a single pillar rigidly mounted on the base 13 of the machine, and pedestal 12 consists of two members 14 extending radially across the fluid stream and mounted on transverse member 15, which is free to slide along the base in the axial direction of the turbine. The members 14 are carried in radial fairings 27 extending across the fluid stream in annular section 4.

The longitudinal movement of pedestal 12 is effected by a lead screw 16 fitted with a handle 17.

Figure 3:
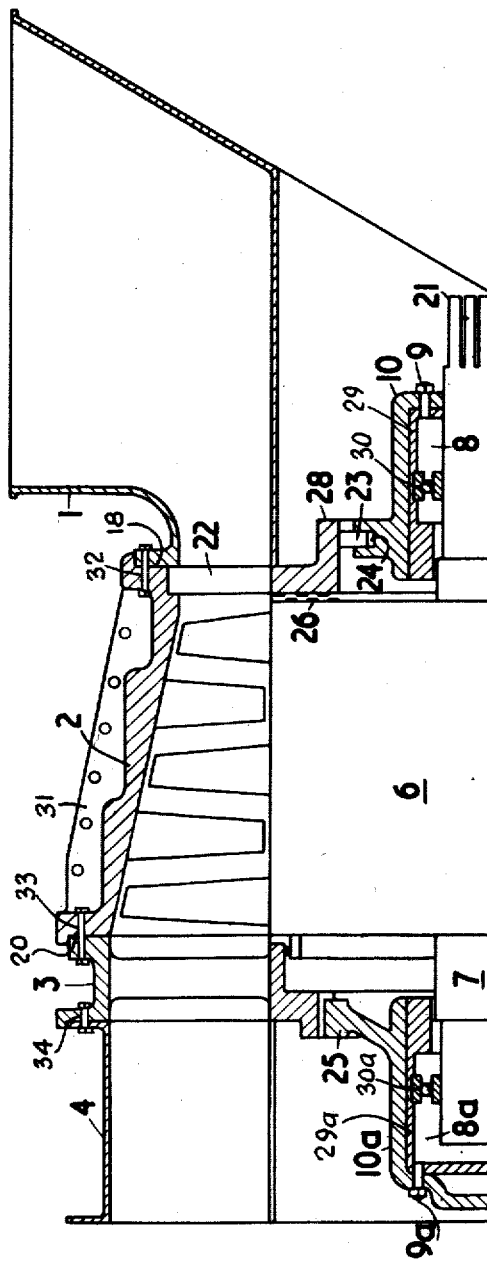

Referring to Fig. 3, at the entry end of the stator, nozzle vanes 22 are shown diagrammatically as mounted on a ring 28, fitted with a series of radially inward extending pegs 23, which engage with radial holes 24 drilled in bearing housing 10. Annular section 3 is similarly supported from the bearing housing 10a except that the pegs are replaced by a series of keys or splines 25 having radial flanks which form a connection which will permit sliding in an axial as well as in a radial direction. At the entry end, the stator is supported on the nozzle vanes 22 and by attachment to the volute 1, and at the exit end it is secured to annular section 3. Annular section 4, which may be of relatively light construction, is secured to annular section 3 but is not directly supported by pedestal 12. Similarly, the volute 1 is not directly supported on pedestal 11 and consequently the entire stationary structure is carried by the radial pegs and keys and is free to expand both axially and radially, independently of the rotor shaft, to permit thermal expansion in diameter and length.

It will be seen that the bearing units are enveloped by the annular inlet and exhaust ducts. To inspect bearing unit 8, the exhaust duct extension 5 is removed and the output shaft 21 disconnected from the driven equipment. The joint 18 between the inlet volute 1 and the stator casing 2 is disconnected (for example, by removing the connecting bolts) and the nuts on the studs 9 holding bearing shell 29 in its housing 10 are removed. The pedestal 12 together with annular sections 3 and 4, the stator casing, rotor and shaft is then withdrawn by means of the lead screw 16, thereby pulling bearing shell 29 axially out of its housing. When the gap at the joint face 18 is wide enough, but before the bearing shell 29 is completely withdrawn from its housing, a support 19 is bolted to the stator to support both it and the shaft. This position is shown in Figure 1. The support slides on the base, so the whole assembly can be withdrawn until the bearing unit is entirely clear of the housing. The shell of the bearing can then be removed and the bearing inspected.

To inspect bearing unit 8a, a similar procedure is tdopted. Joint 20 between the stator 2 and the annular exhaust duct section 3 is disconnected, and the nuts 9a removed, and pedestal 12 together with bearing housing 10a and annular sections 3 and 4 only is withdrawn. The temporary support 19 would be inserted at joint face 20.

When joint 18 is disconnected, the nozzle vanes 22 and the rotor end seal 26 may also be examined. Similarly the rear end of the stator and rotor may be inspected when joint 20 is broken.

The stator has a joint 31, for assembly, the division being along such an axial plane—e. g. a vertical plane— that the two halves can be separated sideways, so that the rotor and stator blades may be inspected by disconnecting this joint and the joints 18 and 20. The two halves of the stator may then be removed and the blades examined. This type of construction is particularly useful in gas turbines where provision is made for replacing single blades of the rotor, as described in British Patent 640,969.

The volute 1 and annular section 3 are of one piece construction, and therefore serve to stiffen the stator and prevent its uneven thermal expansion.

When the two radial fairing members 14 supporting the bearing housing 10a become heated during operation of the plant, they will tend to expand axially, and their combined effect will be to raise the bearing housing vertically. This movement will cause bending of these members in a plane transverse of the axis of the plant. To prevent excessive bending stress occurring, the members must be flexible in this direction, but they must still offer considerable resistance to bending under load applied longitudinally of the machine. To this end, the members are, as shown in the drawings, of elongated cross section, the greater dimension being in the direction of the axis of the plant.

In the event of one bearing housing pedestal expanding to a greater extent than the other, it is possible that the rotor shaft may experience a slight degree of misalignment. This may be allowed for by the use of flexible bearing supports as described in British Patent 645,401.

What I claim is:

1. An elastic fluid turbine plant comprising a bladed turbine rotor, an enclosing bladed stator, rotor bearings at each end of the rotor, the rotor being carried in said bearings, stationary bearing housings enclosing the bearings, first stator supporting structure including radially extending inner and outer parts rigidly attached to one of the bearing housings and to one end of the stator respectively, said parts being jointed together for relative sliding movement in a radial sense and being disposed around the turbine axis at a plurality of points, further stator supporting structure including radially extending inner and outer parts rigidly attached to the other of the bearing housings and to the other end of the stator respectively, said parts being jointed together for relative sliding movement in both an axial and radial sense and being disposed around the turbine axis at a plurality of points and pedestals supporting each of said bearing housings.

2. An elastic fluid turbine plant according to claim 1 wherein said points at which the inner and outer parts of the supporting structures are jointed together are symmetrically disposed around the turbine axis.

3. An elastic fluid turbine plant according to claim 1 wherein one of said supporting structures comprises gas flow ducting surrounding the bearing housing and axially abutting with and rigidly connected to the end of the stator, the outer parts of said supporting structure being rigidly attached to the ducting.

4. An elastic fluid turbine plant according to claim 1 wherein one of said supporting structures comprises a row of turbine nozzle vanes, the end of the stator engaging with and resting on the tips of said vanes, the outer parts of said supporting structure being rigidly attached to the vanes.

5. An elastic fluid turbine plant according to claim 1 wherein the jointed parts of said first supporting structure are constituted by radially extending pegs and a member formed with radially extending holes in which the pegs slidably engage, and the jointed parts of said further supporting structure are constituted by axially and radially extending keys and a member formed with keyways in which the keys slidably engage.

6. An elastic fluid turbine plant comprising a base for the plant, a bladed rotor; rotor bearing units one at each end of the rotor; the rotor being carried in said bearing units; bearing housings enclosing the bearing units; said bearing units being axially slideable into and out of their housings from the rotor end thereof; means for releasably retaining said bearing units against axial movement; pedestals mounted on said base and one supporting each bearing housing, one of said pedestals being axially movable on said base; stationary structure comprising a bladed stator enclosing the rotor, and gas flow ducts at each end thereof, each said duct surrounding and being supported on the bearing housing at that end; said stationary structure being split into two, the split lying between the positions at which the ducts are supported on the bearing housings, one part accordingly being supported by each bearing housing, and the two parts being detachably connected for axial separation from one another; and means for moving said movable pedestal on said base away from the other pedestal supported by said housing away from the bearing unit enclosed by said housing and the other part of the stationary structure when the two parts of the stationary structure are disconnected and said bearing unit is released from its housing.

7. Plant according to claim 6 wherein the split in the stationary structure is between the stator and the duct supported on the housing carried by the movable pedestal.

8. Plant according to claim 6 wherein each bearing housing has an internal cavity open at the rotor end, and each bearing unit comprises a bearing and a shell enclosing the bearing, said shell being axially slidable into and out of said cavity from the rotor end, said plant further comprising means releasably retaining said shells against axial movement.

References Cited in the file of this patent

UNITED STATES PATENTS

| 1,522,190 | Junggren | Jan. 6, 1925 |
| 2,220,616 | Roder | Nov. 5, 1940 |
| 2,266,577 | Warren | Dec. 16, 1941 |
| 2,421,833 | Cronstedt et al. | June 10, 1947 |
| 2,479,038 | Cronstedt | Aug. 16, 1949 |
| 2,505,217 | Smith et al. | Apr. 25, 1950 |
| 2,591,399 | Buckland et al. | Apr. 1, 1952 |
| 2,616,662 | Mierley | Nov. 4, 1952 |

FOREIGN PATENTS

| 369,680 | Great Britain | Mar. 31, 1932 |
| 371,280 | Great Britain | Apr. 21, 1932 |
| 882,330 | France | May 31, 1943 |

UNITED STATES PATENT OFFICE
CERTIFICATE OF CORRECTION

Patent No. 2,803,429                                   August 20, 1957

Leslie Thomas Whitehead

It is hereby certified that error appears in the printed specification of the above numbered patent requiring correction and that the said Letters Patent should read as corrected below.

Column 4, lines 20 to 22, strike out — supported by said housing away from the bearing unit enclosed by said housing and the other part of the stationary structure".

Signed and sealed this 21st day of April 1959.

(SEAL)

Attest:
CARL H. AXLINE
Attesting Officer

ROBERT C. WATSON
Commissioner of Patents